(12) United States Patent
Mitsui

(10) Patent No.: US 9,685,142 B2
(45) Date of Patent: Jun. 20, 2017

(54) OBTAINING AND DISPLAYING RELATIONSHIPS BETWEEN ELEMENTS

(71) Applicant: International Business Machines Corporation, Armonk, NY (US)

(72) Inventor: Kinichi Mitsui, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/930,990

(22) Filed: Nov. 3, 2015

(65) Prior Publication Data
US 2017/0124988 A1    May 4, 2017

(51) Int. Cl.
| | |
|---|---|
| *G06T 11/20* | (2006.01) |
| *G09G 5/34* | (2006.01) |
| *G09G 5/32* | (2006.01) |
| *G06F 3/0482* | (2013.01) |
| *G06F 3/0485* | (2013.01) |

(52) U.S. Cl.
CPC .......... *G09G 5/34* (2013.01); *G06F 3/0482* (2013.01); *G06F 3/04855* (2013.01); *G09G 5/32* (2013.01); *G09G 2340/0464* (2013.01)

(58) Field of Classification Search
CPC .. G06T 11/206; G06F 19/26; G06F 17/30713; G06F 17/30716
See application file for complete search history.

(56) References Cited

U.S. PATENT DOCUMENTS

| | | | |
|---|---|---|---|
| 6,236,400 B1 * | 5/2001 | Guerrero | G06F 3/0482 715/841 |
| 6,380,947 B1 | 4/2002 | Stead | |
| 6,421,071 B1 | 7/2002 | Harrison | |
| 6,604,114 B1 * | 8/2003 | Toong | G06F 17/30014 |
| 6,738,787 B2 * | 5/2004 | Stead | G06F 3/0482 345/440 |
| 7,421,665 B2 | 9/2008 | Molesky et al. | |

(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Phi Hoang
(74) *Attorney, Agent, or Firm* — Heslin Rothenberg Farley & Mesiti P.C.

(57) ABSTRACT

A method, computer program product, and system to optimize the display of related elements. The method includes a processor obtaining data elements and groups of data elements, and relationships between data elements in different groups and identifying parent-child dependencies between the groups. The processor identifies a root group among the groups: the root group has no parent dependency. The processor orders data elements in the root group, based on a predetermined policy and determines a display order of data elements in groups that are not root groups by optimizing a length of relationship lines representing the relationships between the data elements in different groups. The processor also determines a scroll position for each group and displays, in a graphical user interface on the display, the groups with a scroll bars at the scroll position in each group, and the relationships between data elements in different groups.

20 Claims, 9 Drawing Sheets

(56) References Cited

U.S. PATENT DOCUMENTS

| | | | |
|---|---|---|---|
| 2004/0122789 A1* | 6/2004 | Ostertag | G06F 9/4443 |
| 2005/0057575 A1* | 3/2005 | Nickolayev | H04L 41/22 345/619 |
| 2006/0059435 A1* | 3/2006 | Molesky | G06F 3/04855 715/786 |
| 2006/0150169 A1* | 7/2006 | Cook | G06F 8/10 717/156 |
| 2010/0281064 A1* | 11/2010 | Ikegami | G06F 17/2247 707/797 |
| 2014/0013205 A1* | 1/2014 | Mikhaiel | G06F 17/2247 715/234 |
| 2015/0066933 A1* | 3/2015 | Kolodziej | G06F 17/30554 707/737 |
| 2015/0178375 A1* | 6/2015 | Ishizaki | G06F 17/30327 707/737 |

\* cited by examiner

500

510

Program code obtains data elements and groups of data elements, where each data element is associated with a group, and relationships between data elements in different groups.

520

Program code identifies parent-child dependencies between the groups

530

Program code locates a root group within the groups, where the root group has no parent dependency.

540

Program code orders elements in the root group, based on a predetermined policy.

550

Program code determines the display order of elements in groups that are not root groups by optimizing the length of relationship lines representing the relationships between the data elements in different groups.

560

Program code obtains attributes of a display communicatively coupled to the one or more processors upon which the program code was executed and based on these attributes, determines a scroll position for each group.

570

Program code displays the groups with scroll bars at the scroll positions, and the relationships with the relationship lines of optimized length in a graphical user interface on the display.

FIG. 5

OBTAINING AND DISPLAYING RELATIONSHIPS BETWEEN ELEMENTS

BACKGROUND

One or more aspects relate, in general, to obtaining and displaying relationships between data elements in a manner that can be comprehended and appreciated by a user in a simplified visual context that is not degraded by increases in elements.

When data elements are stored on a computer system, these elements may have relationships between them. When displaying these elements a graphical user interface (GUI), program code executing on a resource, in a given computer system may also obtain and display the relationships between different elements. However, depending on the number of elements and the number of relationships, the ability of the computer system to display the relationships may be compromised by the limitations of the display. For example, there may be a case where the number is too large to display all the elements on a screen. By adjusting the display scale to zoom out, a wider range of relationships can be displayed, but the readability of the information and the readability of the relationships are compromised.

SUMMARY

Shortcomings of the prior art are overcome and additional advantages are provided through the provision of a computer program product for optimizing a display of elements. The computer program product comprises a storage medium readable by a processing circuit and storing instructions for execution by the processing circuit for performing a method. The method includes, for instance: obtaining, by a processor, data elements and groups of data elements, and relationships between data elements in different groups, wherein each data element is associated with a group; identifying, by the processor, parent-child dependencies between the groups; based on identifying the parent-child dependencies, identifying, by the processor, a root group among the groups, wherein the root group has no parent dependency; ordering, by the processor, data elements in the root group, based on a predetermined policy; determining, by the processor, a display order of data elements in groups that are not root groups by optimizing a length of relationship lines representing the relationships between the data elements in different groups, wherein the relationship lines are visible elements in a graphical user interface that form a visual linkage between the data elements in different groups in the relationships; obtaining, by the processor, attributes of a display communicatively coupled to the processor and based on these attributes, determining a scroll position for each group; and displaying, by the processor, in a graphical user interface on the display, the groups with a scroll bars at the scroll position in each group, and the relationships between data elements in different groups with the relationship lines of optimized length connecting related data elements.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5 is a workflow diagram depicting aspects of the present technique;

DETAILED DESCRIPTION

Figure 1:
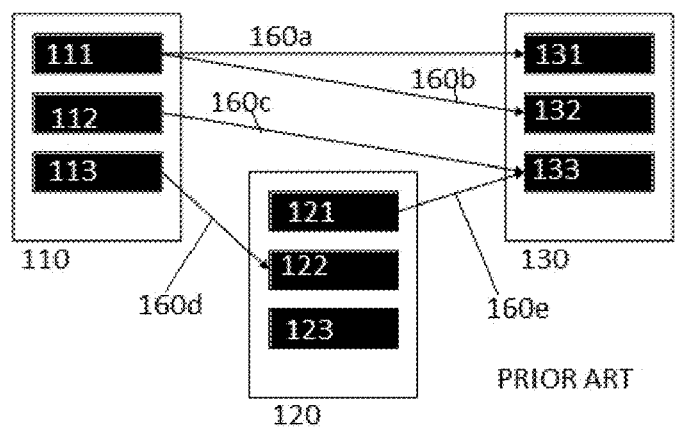
FIG. 1 depicts existing issues with displaying elements and relationships between elements within the constraints of a display.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 11:
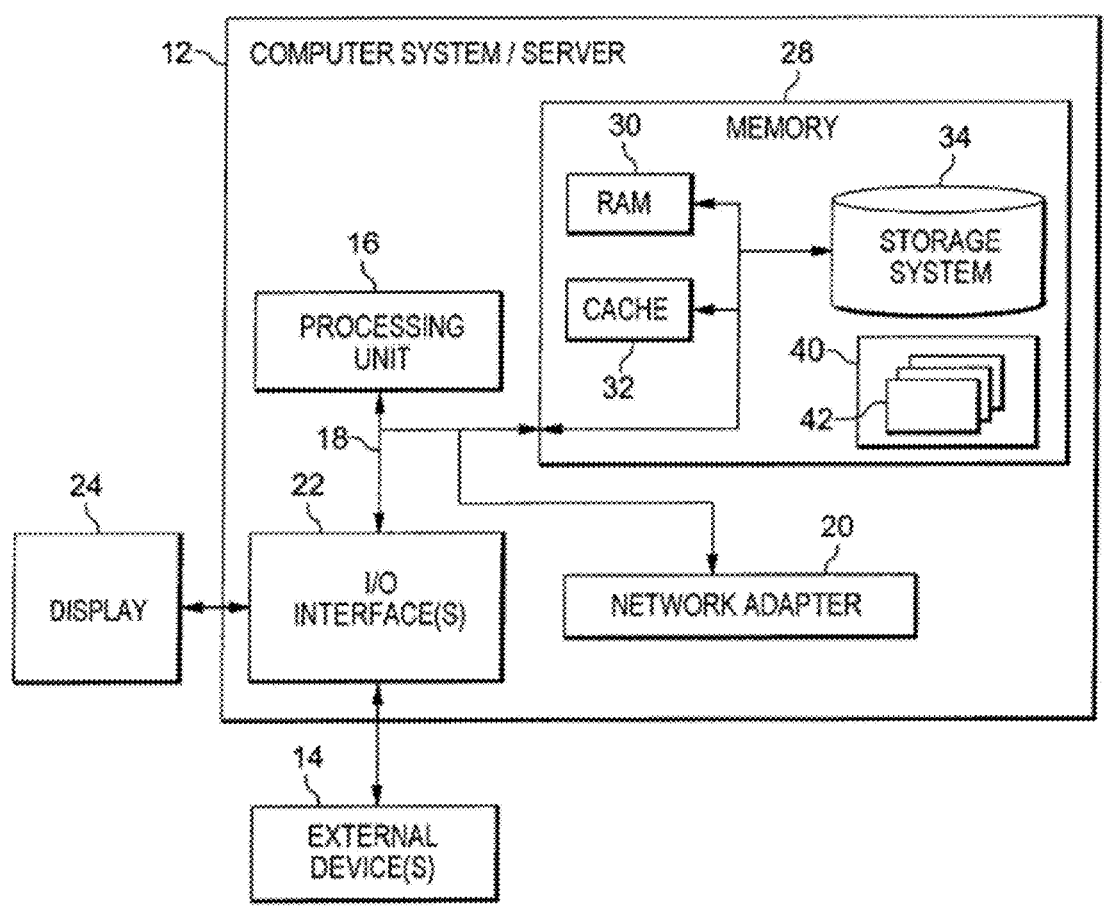
FIG. 11 depicts one embodiment of a cloud computing node.

In an embodiment of the present invention, program code (e.g., a program/utility 40, having a set (at least one) of program modules 42, FIG. 11) executing on at least one processing resource, in a computer system, displays groups of elements as lists, and also displays the relationships among the elements by, for example, displaying each group as a scrollable circular list independently and causing the scroll position of each group to be automatically changed so that the number of displayed relationship lines, indicating relationships between elements, can be maximized. An embodiment of the present invention calculates a display order for the elements of each of the aforementioned circular lists in advance of generating the display by utilizing one or more of: dependence relationships among groups, a policy of minimizing the sum total of lengths of relationship lines, and a display order for automatically changing scroll positions within groups. An embodiment of the present invention includes a method of arranging and displaying figures that indicate relative positions of end points of hidden relationships of elements in the aforementioned lists. These hidden relationships may be displayed near each list in order to show the existence of relationships that are not expressly displayed.

Aspects of certain embodiments of the present invention provide advancements in computing technologies. For example, by utilizing some aspects of embodiments of the present invention, program code can display an unlimited number of relationships between elements on a given display (e.g., a monitor) when displaying relationships among grouped elements. Certain embodiments of the present invention enable a user to recognize the existence of relationships that the program code does not displayed because the program code can display these hidden relationships utilizing a minimal number of operations, increasing the efficiency of the computer system as well as enhancing the user experience.

In certain embodiments of the present invention, program code obtains and displays relationships among related elements in an arrangement such that a user can easily comprehend and appreciate the relationships between the elements and the limitations of the display itself do not limit the user's ability to perceive and comprehend the data displayed, regardless of the number of elements and the number of relationship between these elements. By coherently displaying both elements and relationships between elements, embodiments of the present invention can be utilized to enhance various software and hardware, including but not limited to Rational Engineering Lifecycle Manager (RELM) products. In an RELM, program code in an embodiment of the present invention can generate a relationship display screen. An RELM visualizes information elements (such as requirements specifications and design models) in development tools used for development of software, including the relationships among the information elements.

With an unlimited number of elements and a potentially unlimited number of relationships between these elements, accurately representing all the elements and all the relationships within the limitation of a display, including but not limited to, one monitor, is problematic. Thus, in an embodiment of the present invention, program code renders the elements and the relationships between the elements by grouping certain elements in lists and rendering scroll bars for these list, such that a user may scroll through the elements. In an embodiment of the present invention, the program code connects certain elements from one scrolling list to elements in another scrolling list in order to represent relationships between these elements.

Figure 2:
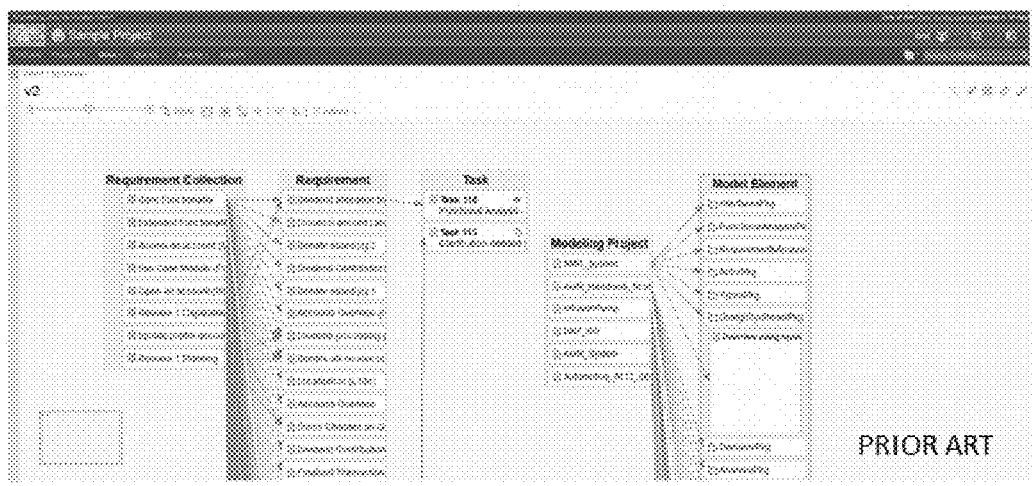
FIG. 2 depicts existing issues with displaying elements and relationships between elements within the constraints of a display.

FIGS. 1-2 demonstrate existing issues with displaying elements and relationships between elements within the constraints of a display. Referring to FIG. 1, this figures represents groups of elements 110, 120, 130, which contain individual elements 111-113, 121-123, 131-133. The individual elements in each group 110, 120, 130, have relationships 160a-160e between them. These relationships 160a-160e, which are represented visually by lines between elements, are referred to as relationship lines. FIG. 2 shows an RELM Product and how this RELM Product displays elements and relationships between elements. As can be observed by the figure, due to the multitude of relationships between elements and the number of elements, visually comprehending both the true number of elements and the number of relationships is challenging. As demonstrated by FIG. 2, in order to cause the relationships among elements among multiple groups to be easy to see, elements in a group is often displayed in a list of one column in a vertical direction. Also, the number of elements in each group may differ among groups, and there may be a case where the number is too large to display all the elements on the screen. By adjusting the display scale to zoom out on FIG. 2, a wider range of relationships could arguably be displayed, but this view would decrease the readability of the information and of the relationships. As demonstrated in this example, if the number of elements included in each group differs significantly among groups, related elements are far away from each other and difficult to see in a simple layout.

Figure 3:
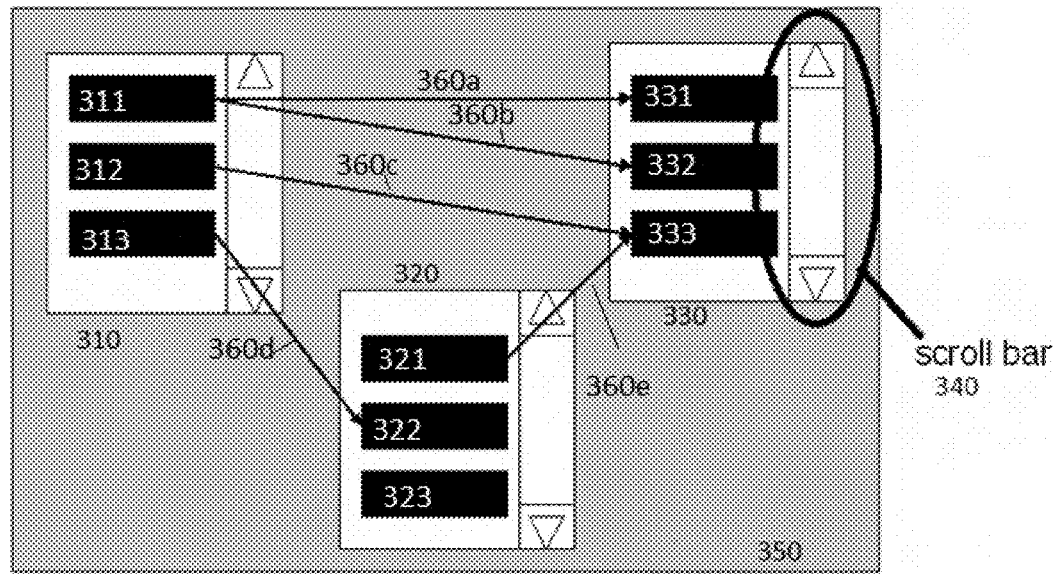
FIG. 3 depicts aspects of certain embodiment of the present invention.
Figure 4:
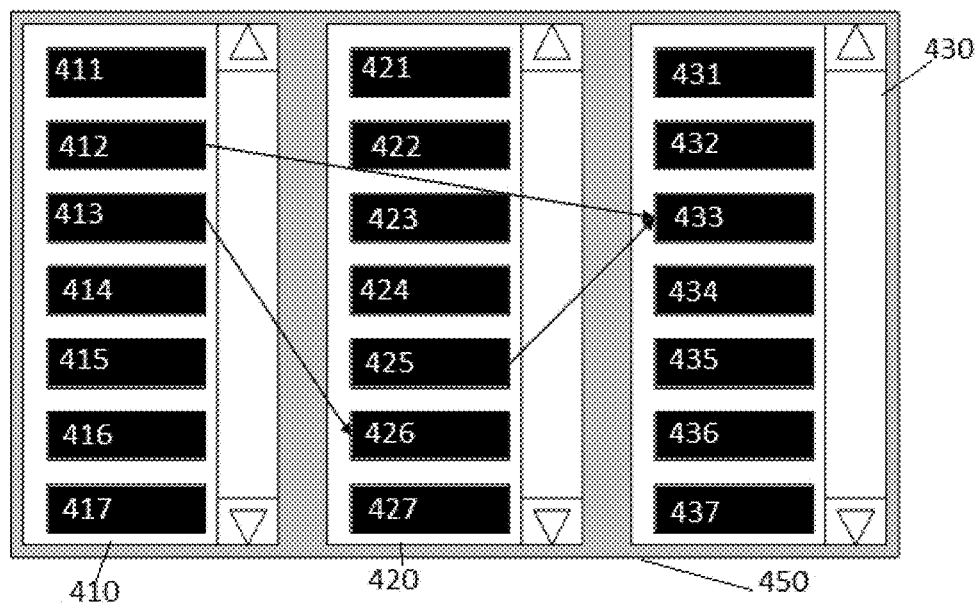
FIG. 4 depicts aspects of certain embodiment of the present invention.

FIG. 3-4 depict aspects of certain embodiment of the present invention. In particular, each figure depicts an example of a GUI generated by program code in an embodiment of the present invention. In both examples, the program code has obtained the relationships between elements and generated a graphical representation of both the elements and the relationships that can be perceived by a given user. The program code also obtains attributes of a display of the system in which the program code will render the representation and generates the representation based on these attributes.

Referring to FIG. 3, based on attributes of a display in a computing environment, program code in an embodiment of the present invention may set certain constraints it may utilize when displaying groups of items. In an embodiment of the present invention, a size of a rectangular area for each group 310, 320, 330 is predetermined, and the program code arranges groups of elements 311-313, 321-323, 331-333, such that all the groups are included on a display 350 (e.g., screen). In order to display the all the groups of on the screen 350, in an embodiment of the present invention, program code selects a number of groups to display. In an embodiment of the present invention, the program code displays the groups simultaneously. An embodiment of the present invention also displays relationships 360a-360e between elements from different groups.

In an embodiment of the present invention, if the number of elements in a group cannot be displayed within a predefined size for a group (e.g., a rectangle), the program code displays a scrolling mechanism, including but not limited to, a scroll bar 340, for each group where the number of elements exceeds the confines of the group display. In an embodiment of the present invention, the program code renders the scroll functionality in a manner that enables a user to navigate group elements in a GUI using a scroll bar, a cursor key operation, and/or a slide operation.

In an embodiment of the present invention, the program code renders a group 330 such that it can be scrolled as a circular list when the elements are not all visible on a display 350 within the designated area, which may include a rectangle. A circular list can be infinitely scrolled in both of upward and downward directions. As for scrolling, neither the upper end nor the lower end exists. In an embodiment of the present invention, when the program code renders each group as a circular list, each element in the list is equal to other related elements in distance, and the amount of scrolling required to display hidden relationships is minimized when compared to an embodiment that utilizes a scroll bar 340, but does not utilize a circular list.

In an embodiment of the present invention, the program code orders the elements in each group to display the maximum number of relationships between elements in different groups on one screen 350, at a default scroll position for each group 310, 320, 330. In an embodiment of the present invention when based on the relationships, the elements, and the attributes of the display, including but not limited to, sizing constraints, the program code determines a display order of elements in the each group so that when relationships 360a-360e cannot all be included in one display 350, the program code order the elements 311-313, 321-323, 331-33 as closely as possible so that, even when scrolling is necessary to view all relationships, hidden relationships can be displayed with as short a scroll as possible.

In an embodiment of the present invention, when a user scrolls through any group, the program code displays other related groups automatically by scrolling the additional groups in the display 350 to a position where the maximum number of relationships between the elements of the group being scrolled and the elements of the remaining groups is optimized. For example, referring to FIG. 3, if a user utilizes a scroll bar 340 to scroll through the elements 331-333 of a given group 330, program code determined the ideal position of elements in any other group displayed, for example, in a second group 320 and a third group 310, such that the maximum number of relationships between the elements 321-323 of the second group 320 and/or the elements 311-313 of the third group 310 with elements 331-333 or the initial group 330 are visible in the display 350. In an embodiment of the present invention, a user and/or process can disable the aforementioned automatic scrolling functionality. Thus, in an embodiment of the present invention, the program code may check to see whether this functionality is enabled before automatically scrolling the position of elements in a group based on a user scrolling the position of at least one given group.

Referring to FIG. 4, as aforementioned, in certain embodiments of the present invention, program code executing on at least one processor can determine how to display groups of elements based on obtaining attributes of the display upon which the program code will display these elements and the relationships between these elements. As illustrated in FIG. 4, in an embodiment of the present invention, the program code arranges groups of elements in rectangles and obtains the attributes of the display 450 (e.g., a screen or monitor) and adjusts the height of each group rectangle is adjusted to fit to the height of the display 450, and rectangles are horizontally arranged. In an embodiment of the present invention, the program code displays rectangles representing the first group of elements 410, a second group of elements 420, and a third group of elements 430 parallel to each other in a display similar to a table. One benefit of this embodiment is the efficiency of space utilization of the display 450.

FIG. 5 is a workflow depicting aspects of certain embodiments of the present invention. As illustrated by the workflow, in an embodiment of the present invention, program code executing on at least one processor in a computer system, obtains related data elements, obtains attributes related to a display in a computer system, and generates a graphical representation of the elements and the relationships that maximizes the amount of element and relationship information visible to a client utilizing the display.

Each portion of this workflow will be discussed in greater detail, however, as illustrated in FIG. 5, in an embodiment of the present invention, program code obtains data elements and groups of data elements, where each data element is associated with a group, and relationships between data elements in different groups (510). The program code identifies parent-child dependencies between the groups (520). Based on identifying the parent-child dependencies, the program code locates a root group within the groups, where the root group has no parent dependency (530). The program code orders elements in the root group, based on a predetermined policy (540). The program code determines the display order of elements in groups that are not root groups by optimizing the length of relationship lines representing the relationships between the data elements in different groups (550). The program code obtains attributes of a display communicatively coupled to the one or more processors upon which the program code was executed and based on these attributes, determines a scroll position for each group (560). The program code displays the groups with scroll bars at the scroll positions, and the relationships with the relationship lines of optimized length in a graphical user interface on the display (570).

As depicted in FIG. 5, program code, in an embodiment of the present invention, obtains data elements and groups of data elements, where each data element is associated with a group, and relationships between data elements in different groups (510).

Figure 6:
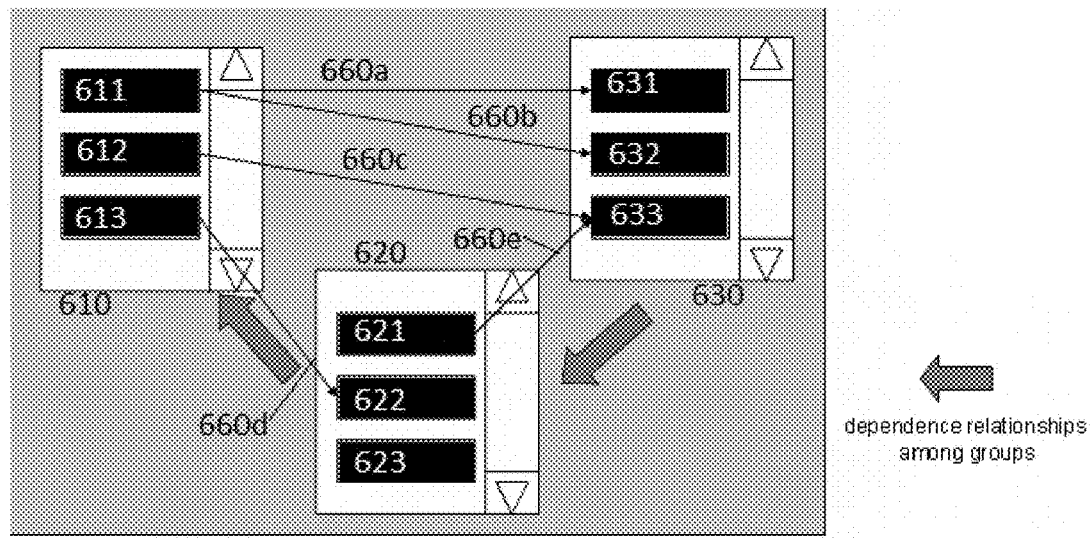
FIG. 6 illustrates child-parent dependency between groups in an embodiment of the present invention.

In an embodiment of the present invention, program code identifies parent-child dependencies between the groups (520). In an embodiment of the present invention, one or more groups may depend from one or more other groups. A group that does not have a parent is called a root. FIG. 6 illustrates child-parent dependency between groups in an embodiment of the present invention. In this non-limiting example, a first group 630 is the parent group of a second group 620, which is the parent of child group 610. Note that the child-parent relationship (also referred to as a dependency) between the group is separate from the relationships 660a-660e between individual elements from the groups. In an embodiment of the present invention, the program code determines the display order of elements in a certain group based on the display order of elements in its parent group.

In an embodiment of the present invention, based on identifying the parent-child dependencies, the program code locates a root group within the groups, where the root group has no parent dependency (530). Once the program code has identified one or more root groups, program code orders elements in the root group, based on a predetermined policy (540). Policies may include, but are not limited to alphabetical, the order of an attribute value in each element.

Returning to FIG. 5, once the program code determines the order of elements in a root group, according to the predetermined policy, the program code follows the dependence (parent-child) relationships between groups and the program code determines the display order of elements in groups that are not root groups by optimizing the length of relationship lines representing the relationships between the data elements in different groups (550). In an embodiment of the present invention, optimizing the length of relationship lines includes determining a local minimum value of the sum total of lengths in relationship lines.

Figure 7:
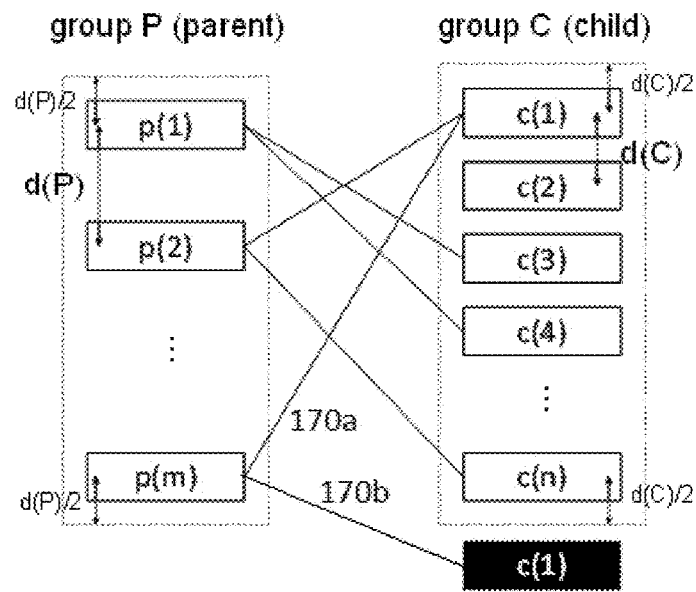
FIG. 7 illustrates aspects of determining the order of child elements in groups that are not root groups, in certain embodiments of the present invention.

FIG. 7 illustrates aspects of determining the order of child elements in groups that are not root groups, in certain embodiments of the present invention. Specifically, in an embodiment of the present invention, when program code has determined a particular display order of child elements, layout of the elements as illustrated in FIG. 7 is assumed, and the program code determines a sum total of lengths of relationship lines. In an embodiment of the present invention, the program code considers the lengths of lines in the vertical direction when finding the lengths of the relationship lines.

FIG. 7 illustrates how program code in an embodiment of the present invention may order elements within a group. Referring to FIG. 7, the parent elements are indicated by $p(1)$-$p(m)$. The child elements are indicated by $c(1)$-$c(n)$. The distance between parent elements is $d(P)=1/m$ and the distance between child elements $d(C)=1/n$. In this example, for both of the parent and the child groups, the whole height is 1. For functions indicating existence/nonexistence of a relationship between p(i) and c(j) are defined as R(i,j)=1 (in the case where a relationship exists) and R(i,j)=0 (in the case where a relationship does not exist) where 1<=i<=m, 1<=j<=n. A function D(i,j) indicating the length of a relationship line between p(i) and c(j) is defined as by Equations 1-1 and 1-2.

$$r=|d(P)*(i-\frac{1}{2})-d(C)*(j-\frac{1}{2})|$$ Equation 1-1

$$D(i,j)=r \text{ (when } r \text{ is } \frac{1}{2} \text{ or less), } 1-r \text{ (when } r \text{ is more than } \frac{1}{2})$$ Equation 1-2

In Equation 1-1, || indicates an absolute value. The sum total of relationship lines is indicated by Equation 2.

$$S=\Sigma D(i,j)*R(i,j)(1<=i<=m, 1<=j<=n)$$ Equation 2

Referring to FIG. 7, in an embodiment of the present invention, the program code determines the lengths of the relationship lines based on the elements being grouped into circular lists. In an embodiment of the present invention, the program code adopts a shorter relationship line 170b, rather than a longer relationship line 170a to represent the relationship between p(m), an element in a parent set, and c(1), an element in a child set. In an embodiment of the present invention, the program code determines an arrangement of elements where the sum total of lengths of the relationship lines is minimized.

Figure 8:
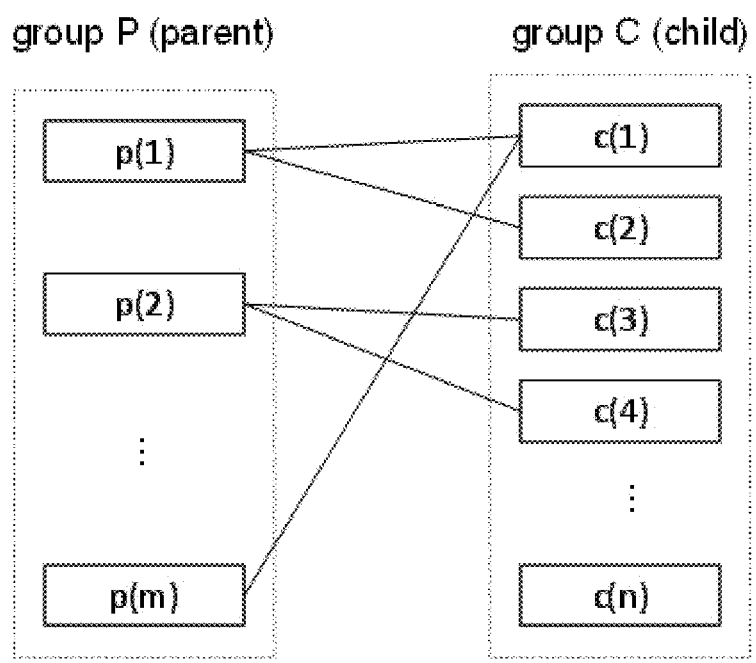
FIG. 8 depicts an example of determining a local minimum value of the sum total of lengths in relationship lines, in accordance with an embodiment of the present invention.

For ease of understanding, FIG. 8 depicts an example of determining a local minimum value of the sum total of lengths in relationship lines, in accordance with an embodiment of the present invention. The program code determines an initial order for child elements, which may not be optimal. In the example in FIG. 8, the program code places child elements related to a parent element p(1) first from the top. Next, among remaining child elements, the program code places child elements related to a parent element p(2). In an embodiment of the present invention, the program code continues organizing the elements in this manner up to a parent element p(m). Then, the program code places the remaining child element. Based on this initial placement, the program code determines the sum total of lengths of relationship lines for the placement of the child elements.

The program code utilizes the initial sum total of relationship lengths in order to determine a minimum length for the relationship lines, which is indicative of a more optimal arrangement for the child elements in a group. To this end, the program code evaluates aspects of the distances representing the relationships between different elements and readjusts the order of the elements until further manipulation of the elements will not result in further decreasing the sum total of lengths of the relationship lines.

In evaluating aspects of the relationships between elements in order to obtain an element order that minimizes the sum of the lengths of these lines, in an embodiment of the present invention, the program code selects or obtains two elements until it finds two elements where the sum total of lengths of relationship lines decreases when the positions of the two are exchanged in order. Based on selecting these elements, the program code evaluates where if, for all of n*(n-1)/2 pairs selected, the sum total does not decrease. If the sum total remains the same, the evaluation is complete. However, if there is such a pair that the sum total decreases, the program code exchange the positions of these elements and obtains additional pairs again, repeating this determination until the sum total of lengths cannot be minimized further by reordering the elements.

In an embodiment of the present invention, the program code obtains attributes of a display and based on the attributes, determines a scroll position for each group (560). Based on the scroll position, certain elements in certain groups may not be visible initially on a display. If the number of elements in each group is larger than the number of elements that can be displayed on a display of a computer system, only a part of the elements are displayed. As illustrated, the program code cannot display certain elements of a display due to the constraints of the display, the program code can generate a scroll bar to be utilized to scroll through the group, to see all the elements. The program code determines the order of elements in groups, including which elements should appear first (at the top) in a display of each. The display scroll position is the position in which the elements appear in the order determined by the program code. When the program code determined the scroll position, the program code displays relationship lines between displayed parent elements and displayed child elements.

In an embodiment of the present invention, the program code obtains attributes of a display communicatively coupled to the one or more processors upon which the program code was executed and based on these attributes, determines a scroll position for each group (560). In an embodiment of the present invention, the program code determines the scroll position of a root group initially. When the program code determines the scroll position of the parent group, the program code determined the scroll position of the child group in linkage therewith.

Figure 9:
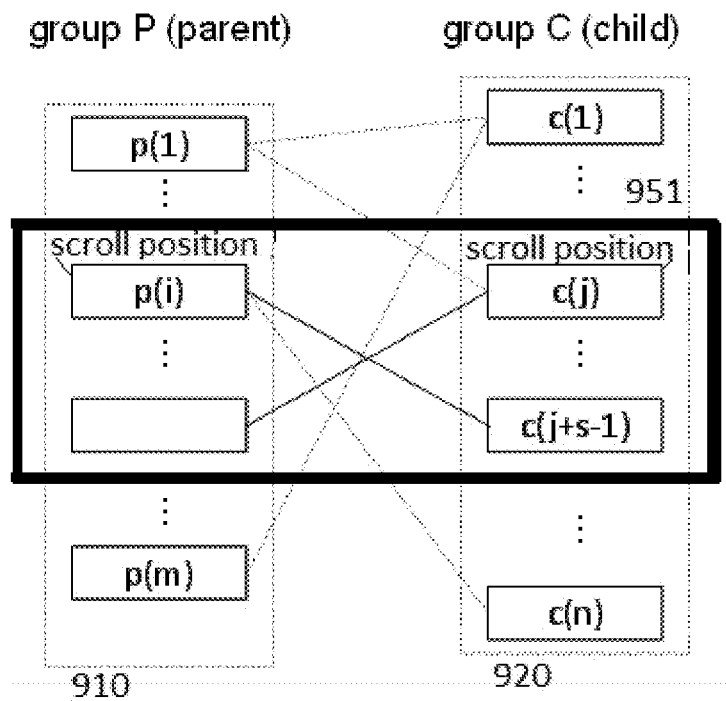
FIG. 9 illustrates determining an initial scroll position of a group in an embodiment of the present invention.

FIG. 9 illustrates how the program code determines an initial scroll position of a group in an embodiment of the present invention. An area 951 represents a range the program code may display on the display (e.g., screen or monitor). As illustrated in this figure, in an embodiment of the present invention, the number of elements of a parent group 910 that can be displayed and the number of elements of a child group 920 that can be displayed are not necessarily the same.) In an embodiment of the present invention, when the number of elements displayed in the child group 920 is indicated by s, there are n−s+1 candidates for the display scroll position. In an embodiment of the present invention, the program code selects a scroll position based on displaying the maximum number of relationship lines.

In an embodiment of the present invention, the program code displays the groups with scroll bars at the scroll positions, and the relationships with the relationship lines of optimized length in a graphical user interface on the display (570).

In an embodiment of the present invention, if a user manually changes the scroll position of a certain group, based on the manual change, the program code changes the scroll positions of groups that are directly and indirectly dependent on the group. In an embodiment of the present invention, a user or program may enable or disable this automatic scrolling functionality. For example, the user may change a setting about whether or not to perform the operation of scroll position linkage among groups when the user is performing an operation.

In an embodiment of the present invention, at a default position, the program code displays a maximum number of relationship lines in order to display as many relationships between elements in different groups as possible. The program code may also offer users the option of selecting at least one of the displayed parent elements and selecting a scroll position at which the largest number of relationship lines connected to the element are displayed. In an embodiment of the present invention, when the position of a scroll bar in a child group is changed manually by a user and/or by a process, the program code automatically changes the scroll position of the parent group (and/or ancestors groups) such that the maximum number of relationships is viewable on the display in view of the new positioning of the child group elements.

In various embodiments of the present invention, the timing of the program code changing the scroll positions of certain groups in response to a user or process changing the scroll position of a related group may vary. For example, in certain embodiments of the present invention, the program code may adjust scroll positions of groups immediately upon obtaining the change in position of a given group. However, in some embodiments of the present invention, the program code will not display a list of elements at a new scroll position may not be immediately. Rather, in certain embodiments of the present invention, the program code may set a predetermined delay time. The program code will wait this delay time before displaying elements and groups in new positions. In an embodiment of the present invention, during this delay time, the program code may display an animation to demonstrate the change in position incrementally to the user so that the user can recognize the change made to the display by the program code.

In an embodiment of the present invention, program code displays relationships between elements (e.g., as relationship lines) when the two or more elements in the relationship are displayed in a display (e.g., on screen at the same time). In an embodiment of the present invention, the program code indicates in the display the existence of relationships that are not displayed at a given times because the elements that comprise that relationship are not displayed at that time.

Figure 10:
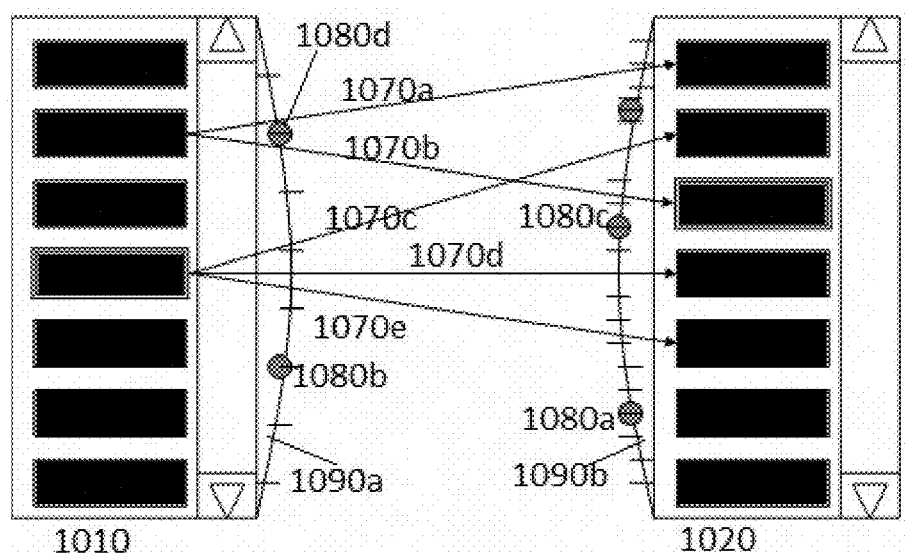
FIG. 10 depicts aspects of certain embodiments of the present invention.

FIG. 10 depicts aspects of certain embodiments of the present invention where the program code displays the existence of relationships that the program code is not displaying on the display.

In an embodiment of the present invention, the program code displays an indicator of additional relationships that are not visible when the display is in a given scrolling position. One example of an indicator is illustrated in FIG. 10 and is a curved line 1090a-1090b. The program code displays a curved line 1090a-1090b, for example, on the left or right of a list and the program code displays small figures, for example, circles 1080a-1080d, on the curved line 1090a-1090b to show existence of end points of relationship lines that are not displayed. The program code displays the small FIGS. 1080a-1080d in positions adapted to indicate relative positions of elements on the end points in the list, as the curved line 1090a-1090b indicates a hidden part of the list. In an embodiment of the present invention, the program code can display indicators to show each side of a hidden relationship. In certain embodiments of the present invention, the type or indicators can vary, for example, different colors and/or attributes can be utilized. In an embodiment of the present invention, the program code may display a scale to indicate to a user the number of hidden elements. By displaying indicators of hidden elements, embodiments of the present invention assist the user in determining how long a scroll is to be performed in an upward or downward direction to display hidden relationship lines in the visible portion of the display.

If the number of elements in each group is larger than the number of elements that can be displayed on the screen, only a part of the elements are displayed. Since the order of the elements is predetermined in the direction described before, an element to be displayed at the top is determined at the time of displaying the elements on the screen. This is referred to as determination of a display scroll position.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
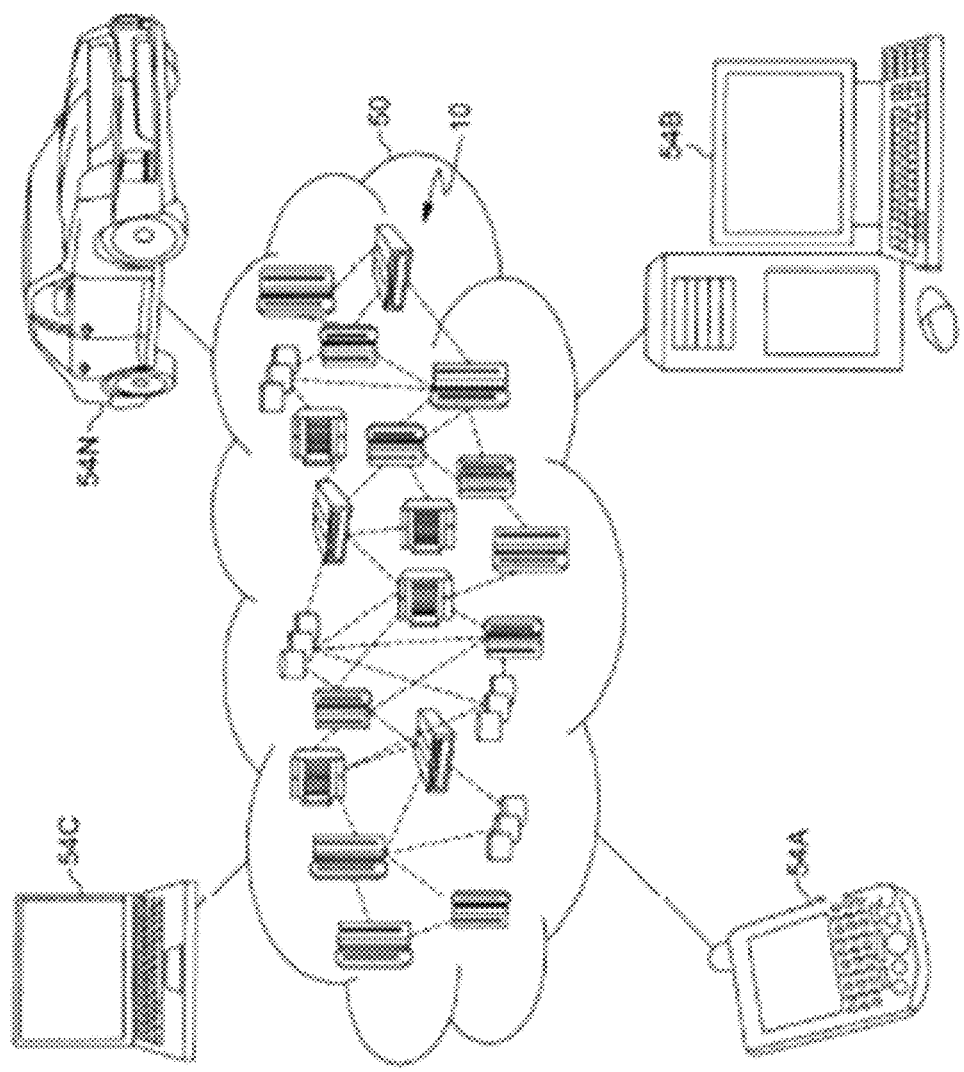
FIG. 12 depicts one embodiment of a cloud computing environment.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 13:
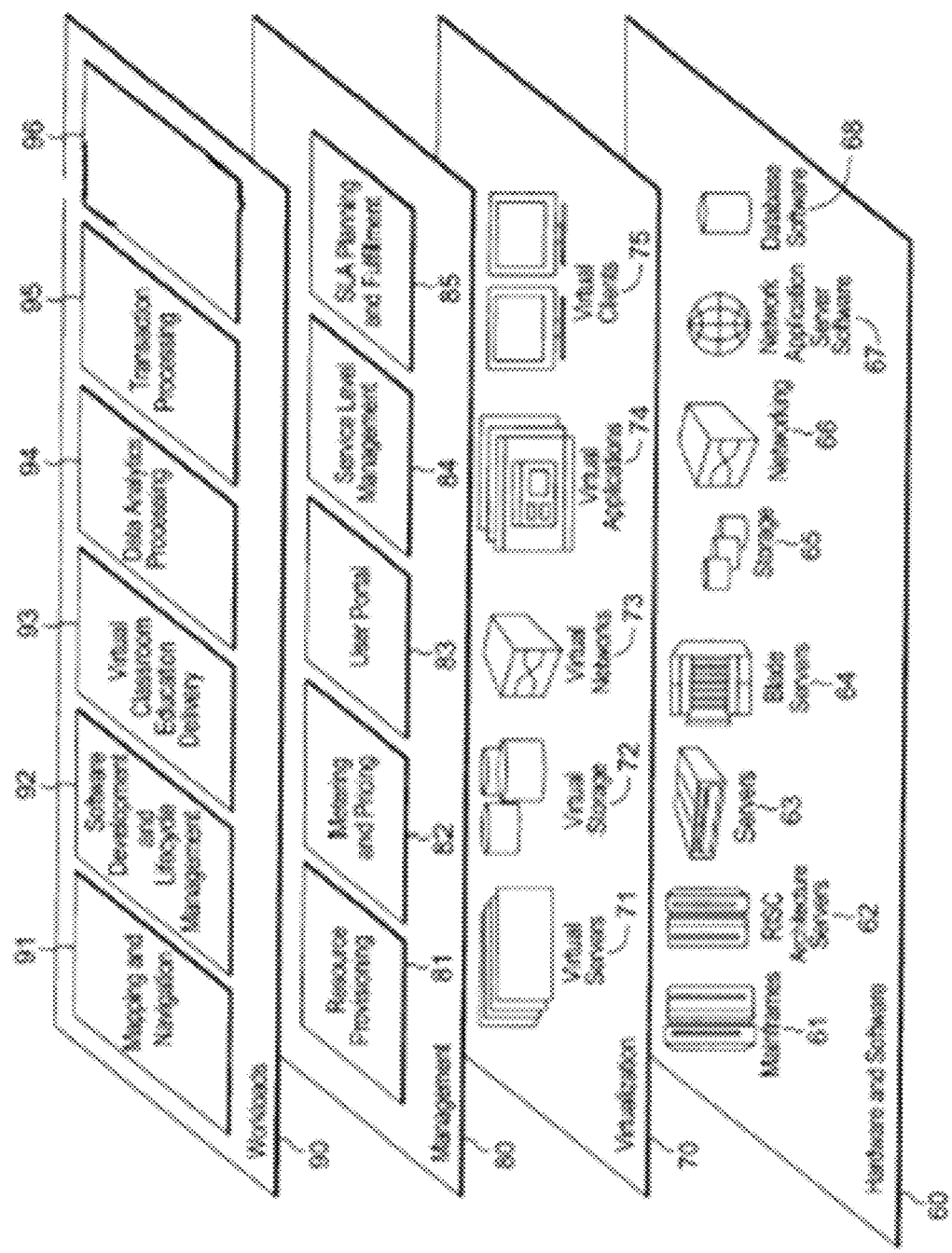
FIG. 13 depicts one example of abstraction model layers.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and obtaining and displaying relationships between groups and elements to user in an optimal manner.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for obtaining and displaying relationships between data elements in a computer system, comprising:

obtaining, by a processor, data elements and groups of data elements, and relationships between data elements in different groups, wherein each data element is associated with a group;

identifying, by the processor, parent-child dependencies between the groups;

based on identifying the parent-child dependencies, identifying, by the processor, a root group among the groups, wherein the root group has no parent dependency;

ordering, by the processor, data elements in the root group, based on a predetermined policy;

determining, by the processor, a display order of data elements in groups that are not root groups by optimizing a length of relationship lines representing the relationships between the data elements in different groups, wherein the relationship lines are visible elements in a graphical user interface that form a visual linkage between the data elements in different groups in the relationships, wherein the optimizing comprises:

selecting, by the processor, from the groups, a child group;

determining, by the processor, an initial order for data elements a in the child group by placing data elements in the child group related to data elements in a parent group before data elements in the child group not related to data elements in the parent group;

displaying, by the processor, relationship lines representing relationships between data elements in the child group to data elements in the parent group;

obtaining, by the processor, a sum of the lengths of the relationship lines; and minimizing, by the processor, the sum, wherein the minimizing comprises:

identifying, by the processor, a first data element in a first position in the child group and a second data element in a second position in the child group, wherein moving the first data element to the second position and moving the second data element to the first position reduces the sum; and exchanging, by the processor, the positions of the first data element and the second data element; and obtaining, by the processor, attributes of a display communicatively coupled to the processor and based on these attributes, determining a scroll position for each group; and displaying, by the processor, in a graphical user interface on the display, the groups with a scroll bar at the scroll position in each group, and the relationships between data elements in different groups with the relationship lines of optimized length connecting related data elements.

2. The computer-implemented method of claim 1, wherein the determining the display order of the data elements in the groups comprises determining a display order of the data elements in a child group based on a display order of data elements in a parent group of the child group.

3. The computer-implemented method of claim 1, wherein the optimizing further comprises:
  determining, by the processor, a local minimum value of a sum total of the lengths of the relationship lines.

4. The computer-implemented method of claim 1, wherein the optimizing the lengths of the relationship lines comprises measuring the relationship lines in a vertical direction.

5. The computer-implemented method of claim 1, further comprising:
  obtaining, by the processor, an indicator that a scroll position of a first group has changed to a new scroll position; and
  based on the new scroll position, changing, by the processor, a scroll position of a second group, wherein at least one data element in the second group is related to at least one data element in the first group.

6. The computer-implemented method of claim 5, wherein the changing is completed over a pre-determined period of time.

7. The computer-implemented of claim 1, wherein the displaying comprises displaying a first portion of data elements in a first group in the display and not displaying a second portion of the data elements in the first group, wherein the first portion precedes the second portion in an order of the data elements in the first group.

8. The computer-implemented of claim 7, further comprising:
  displaying, by a processor, in the graphical user interface, a visual indicator of a relationship between a data element in the second portion and another data element.

9. The computer-implemented of claim 1, wherein the determining further comprises, identifying, by the processor, which data elements in each group will be displayed at the scroll position.

10. The computer-implemented method of claim 1, wherein the predetermined policy is selected from the group consisting of: alphabetical order and an attribute value order.

11. A computer program product comprising:
  a non-transitory computer readable storage medium readable by one or more processor and storing instructions for execution by the one or more processor for performing a method comprising:
    obtaining, by a processor, data elements and groups of data elements, and relationships between data elements in different groups, wherein each data element is associated with a group;
    identifying, by the processor, parent-child dependencies between the groups;
    based on identifying the parent-child dependencies, identifying, by the processor, a root group among the groups, wherein the root group has no parent dependency;
    ordering, by the processor, data elements in the root group, based on a predetermined policy;
    determining, by the processor, a display order of data elements in groups that are not root groups by optimizing a length of relationship lines representing the relationships between the data elements in different groups, wherein the relationship lines are visible elements in a graphical user interface that form a visual linkage between the data elements in different groups in the relationships, wherein the optimizing comprises:
      selecting, by the processor, from the groups, a child group;
      determining, by the processor, an initial order for data elements a in the child group by placing data elements in the child group related to data elements in a parent group before data elements in the child group not related to data elements in the parent group;
      displaying, by the processor, relationship lines representing relationships between data elements in the child group to data elements in the parent group;
      obtaining, by the processor, a sum of the lengths of the relationship lines; and
      minimizing, by the processor, the sum, wherein the minimizing comprises:
        identifying, by the processor, a first data element in a first position in the child group and a second data element in a second position in the child group, wherein moving the first data element to the second position and moving the second data element to the first position reduces the sum; and
        exchanging, by the processor, the positions of the first data element and the second data element; and
    obtaining, by the processor, attributes of a display communicatively coupled to the processor and based on these attributes, determining a scroll position for each group; and
    displaying, by the processor, in a graphical user interface on the display, the groups with a scroll bar at the scroll position in each group, and the relationships between data elements in different groups with the relationship lines of optimized length connecting related elements.

12. The computer program product of claim 11, wherein the determining the display order of the data elements in the groups comprises determining a display order of the data elements in a child group based on a display order of data elements in a parent group of the child group.

13. The computer program product of claim 11, wherein the optimizing further comprises determining, by the processor, a local minimum value of a sum total of the lengths of the relationship lines.

14. The computer program product of claim 11, wherein the optimizing the lengths of the relationship lines comprises measuring the relationship lines in a vertical direction.

15. The computer program product of claim 11, further comprising:
  obtaining, by the processor, an indicator that a scroll position of a first group has changed to a new scroll position; and
  based on the new scroll position, changing, by the processor, a scroll position of a second group, wherein at least one data element in the second group is related to at least one data element in the first group.

16. The computer program product of claim 11, wherein the displaying comprises displaying a first portion of data elements in a first group in the display and not displaying a second portion of the data elements in the first group, wherein the first portion precedes the second portion in an order of the data elements in the first group.

17. The computer program product of claim 16, further comprising:
displaying, by a processor, in the graphical user interface, a visual indicator of a relationship between a data element in the second portion and another data element.

18. The computer program product of claim 11, wherein the predetermined policy is selected from the group consisting of: alphabetical order and an attribute value order.

19. A system comprising:
a memory;
one or more processor in communication with the memory; and
program instructions executable by the one or more processor via the memory to perform a method, the method comprising:
  obtaining, by a processor, data elements and groups of data elements, and relationships between data elements in different groups, wherein each data element is associated with a group;
  identifying, by the processor, parent-child dependencies between the groups;
  based on identifying the parent-child dependencies, identifying, by the processor, a root group among the groups, wherein the root group has no parent dependency;
  ordering, by the processor, data elements in the root group, based on a predetermined policy;
  determining, by the processor, a display order of data elements in groups that are not root groups by optimizing a length of relationship lines representing the relationships between the data elements in different groups, wherein the relationship lines are visible elements in a graphical user interface that form a visual linkage between the data elements in different groups in the relationships, wherein the optimizing comprises:
    selecting, by the processor, from the groups, a child group;
    determining, by the processor, an initial order for data elements a in the child group by placing data elements in the child group related to data elements in a parent group before data elements in the child group not related to data elements in the parent group;
    displaying, by the processor, relationship lines representing relationships between data elements in the child group to data elements in the parent group;
    obtaining, by the processor, a sum of the lengths of the relationship lines; and
    minimizing, by the processor, the sum, wherein the minimizing comprises:
      identifying, by the processor, a first data element in a first position in the child group and a second data element in a second position in the child group, wherein moving the first data element to the second position and moving the second data element to the first position reduces the sum; and
      exchanging, by the processor, the positions of the first data element and the second data element; and
  obtaining, by the processor, attributes of a display communicatively coupled to the processor and based on these attributes, determining a scroll position for each group; and
  displaying, by the processor, in a graphical user interface on the display, the groups with a scroll bars at the scroll position in each group, and the relationships between data elements in different groups with the relationship lines of optimized length connecting related elements.

20. The system of claim 19, wherein the predetermined policy is selected from the group consisting of: alphabetical order and an attribute value order.

* * * * *